United States Patent [19]

Morphis et al.

[11] 3,787,951
[45] Jan. 29, 1974

[54] TOOLS FOR JOINING OR DISCONNECTING PIPES

[75] Inventors: Charles W. Morphis; Bennie D. Hilburn, both of Tyler, Tex.

[73] Assignee: The Mead Corporation, Chillicothe, Ohio

[22] Filed: Apr. 14, 1972

[21] Appl. No.: 243,990

[52] U.S. Cl. .................................................. 29/237
[51] Int. Cl. ............................................ B23p 19/04
[58] Field of Search ......................... 29/237; 254/29

[56] References Cited
UNITED STATES PATENTS

| 3,688,378 | 9/1972 | Garvey | 29/237 |
| 3,096,572 | 7/1963 | Simmons | 29/237 |
| 3,471,919 | 10/1969 | Evans | 29/237 |

FOREIGN PATENTS OR APPLICATIONS

| 1,119,300 | 4/1956 | France | 29/237 |

Primary Examiner—James L. Jones, Jr.
Attorney, Agent, or Firm—Jennings, Carter & Thompson

[57] ABSTRACT

A tool for joining or disconnecting lengths of pipe such as bell and spigot pipe in which the joints incorporate rubber-like gaskets. The tool has a handle with a yoke at its lower end disposed to fit about the pipe. A flexible member such as a length of chain is fixed at its ends to the legs of the yoke. The chain is adapted to engage the enlarged section of the pipe, that is, the bell or other enlargement, either at the rear or front thereof depending upon whether the pipe is to be joined or disconnected, respectively. The handle is connected to the plain end pipe either by a chain or a rigid bar-like member depending upon whether the pipe is to be joined or disconnected, respectively. The chain spanning the yoke acts as a fulcrum for the handle and permits one tool to be used for several sizes of pipe.

1 Claim, 11 Drawing Figures

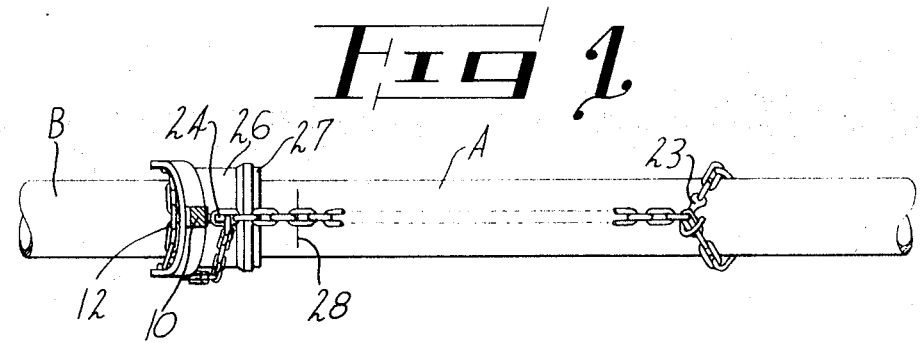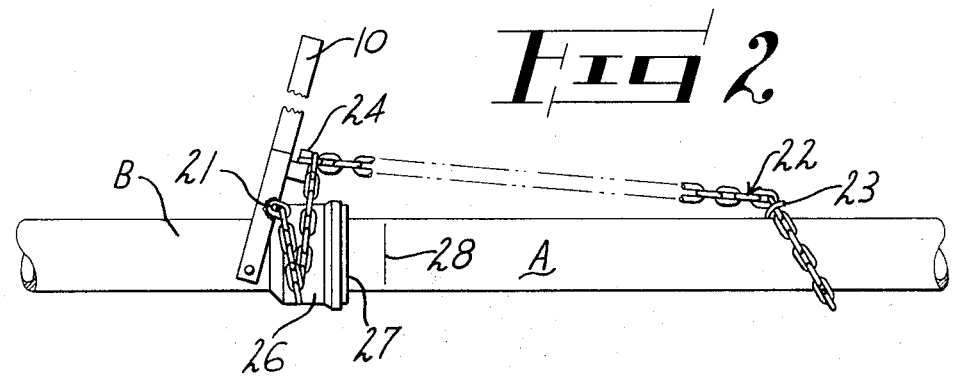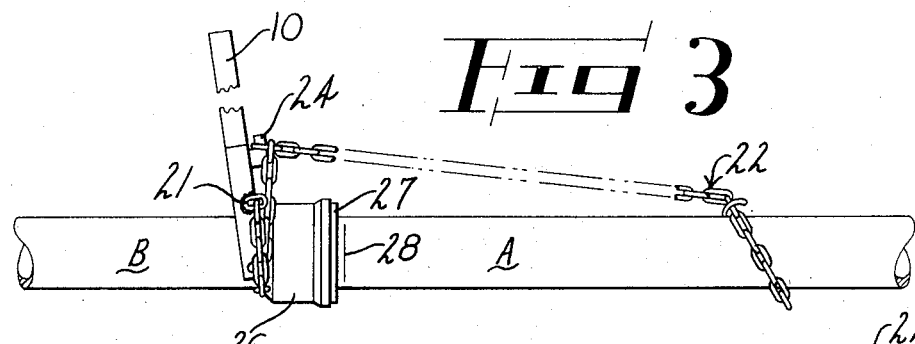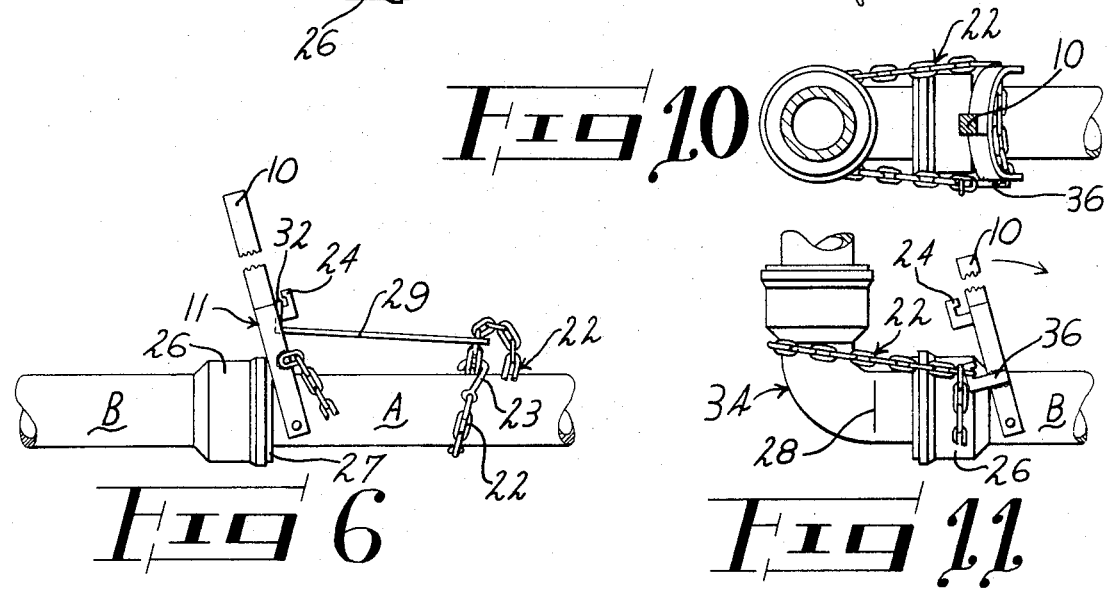

PATENTED JAN 29 1974 3,787,951
SHEET 2 OF 2
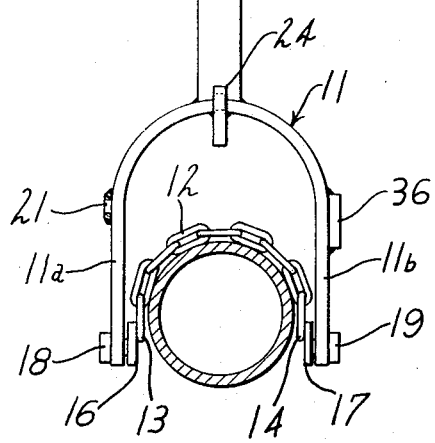
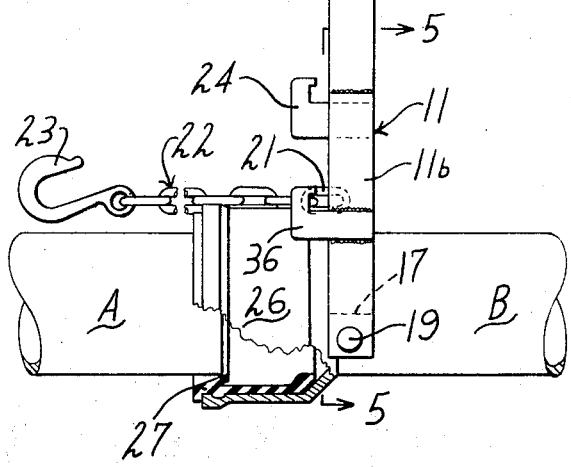
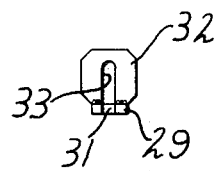
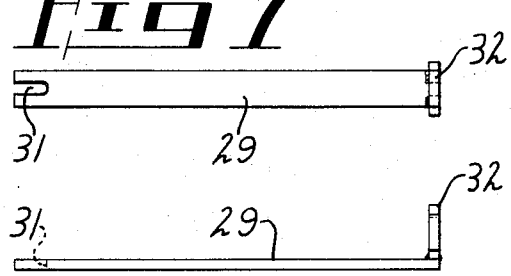

TOOLS FOR JOINING OR DISCONNECTING PIPES

Our invention relates to a tool for connecting or disconnecting pipes such as cast iron pipe having an enlarged section into which the plain end of another length is to be pushed or removed.

In the art to which our invention relates, modern pipe joints involve the use of rubber-like gaskets adapted to be received within the enlarged bell or sleeve on one pipe and being adapted to receive the plain end of another pipe, thus to make up the joint. In such installations considerable force is required to push the plain end pipe into the gasket inasmuch as the clearances are rather close, in order to provide a watertight joint. In similar manner, when pulling these joints apart considerable force must be applied and under some conditions it is difficult for workmen to grasp the pipe by hand, to either make up or disconnect such joints.

An object of our invention is to provide a simple, effective tool which may be used to make up or disassemble pipe joints and which is especially adapted for use with pipes having an enlargement on one end, for instance, a bell, within which the plain end of a similar joint is to be inserted.

A more specific object is to provide a tool of the character designated which comprises an elongated handle carrying a yoke at its lower end, the yoke being spanned by a length of chain or other flexible member so that when the chain is placed at the rear or front of the enlargement, the joint may be made up or taken apart, depending upon whether the connection between the handle and plain end pipe can be put in tension or in compression, respectively.

Another object of our invention is to provide a tool of the character indicated which may be employed to assemble angularly arranged fittings such as elbows and the like.

A still further object is to provide a tool of the character designated in which, through the use of the flexible member for resting on the pipe and which forms the fulcrum for the handle, one tool may accommodate several sizes of pipe, for instance, in a range of two inch to four inch, or from five inch to eight inch, or ten inch to fifteen inch.

A tool illustrating features of our invention is shown in the accompanying drawings forming a part of this application in which:

FIG. 1 is a plan view, partly broken away and in section, and showing the tool applied to a pair of pipes preparatory to making up a joint;

FIG. 2 is a side elevational view with the parts in the position of FIG. 1;

FIG. 3 is a side elevational view with the parts in the position after the handle has been moved to force the plain end pipe into the enlarged diameter end of the other pipe;

FIG. 4 is an enlarged side elevational view showing the tool resting on the barrel of a pipe, behind the enlarged diameter section thereof;

FIG. 5 is a detail sectional view taken generally along line 5—5 of FIG. 4;

FIG. 6 is a side elevational view, partly broken away and in section, and showing our improved tool in position to take apart a pair of pipes which previously have been assembled;

FIG. 7 is a plan view of the rigid bar-like member used to disassemble the pipes as indicated in FIG. 6;

FIG. 8 is a side elevational view of the member shown in FIG. 7;

FIG. 9 is an end elevational view of the member shown in FIG. 8;

FIG. 10 is a plan view, partly broken away and in section, and showing our improved pipe tool in position to insert the plain end of a fitting into the enlarged diameter end of a pipe; and, FIG. 11 is a side elevational view of the tool shown in FIG. 10, partly broken away and in section.

Referring now to the drawings for a better understanding of our invention our improved pipe tool comprises essentially a handle 10 which carries at its lower end a yoke 11. As best shown in FIGS. 4 and 5, the yoke proper comprises legs 11a and 11b which are adapted to straddle the barrel of the pipes to be joined as will be explained.

One of the features of our invention is the provision of a flexible member in the form of a chain 12 which is secured to the legs 11a and 11b. As shown in FIG. 5 the end links 13 and 14 of the chain 12 are welded to plates 16 and 17 which in turn are welded to the inner ends of studs 18 and 19 which pass loosely through holes in the legs 11a and 11b. As will be understood, the spacing of the legs 11a and 11b is such as to accommodate a pipe of the largest size of a given range, for instance, four inch pipe, thus to accommodate not only that size, but also two inch and three inch as well.

Secured to one of the legs, for instance the leg 11a, is the end link 21 of a length of chain 22. On the opposite end of the chain we provide a hook 23.

Located at the juncture of the handle 10 and yoke 11 so as to lie above the level of the pipes to be joined is a hook-like member 24 which may be formed of a piece of plate and cut out as shown in FIG. 4. As will presently appear, the chain may be secured about the barrel of the plain end pipe as shown in FIGS. 1 to 3 with one of its links hooked over the notched out member 24, so that when the handle is rocked from the position of FIG. 1 to the position of FIG. 3, the joint is assembled.

From what has been so far described it will be seen that if it is desired to assemble pipe A into the enlarged diameter section 26 of pipe B, it being understood that a ring type, rubber-like gasket 27 has already been placed in the enlarged diameter section 26, the parts are positioned as illustrated in FIG. 1. That is to say, the yoke is placed about the pipe B, just rearwardly of the enlarged diameter section 26 with the chain 12 resting on top of the pipe. The chain 22 is now placed about the barrel of the plain end pipe, the hook 23 serving to secure the same thereabout as shown in FIGS. 1 to 3, inclusive, and with the handle tilted slightly to the right as shown in FIGS. 1 and 2. A link of the chain is now engaged over the hook member 24, so that when the handle is rocked from the position of FIG. 2 to the position of FIG. 3 the pipe A is pulled into the enlarged section of the pipe B. Thus, the assembly distance is indicated approximately by the line 28 which shows movement of the pipe A from the position of FIGS. 1 and 2 to the position of FIG. 3, which is the final, assembled position.

It will thus be seen that with the parts ready to assemble a pair of pipes, the chain 12 forms a fulcrum for the handle inasmuch as it comes to rest behind the enlarged diameter section 26 of pipe B so that it does not move toward the loop of the chain which is wrapped around pipe A. Therefore, we are able to assemble the pipes with a single movement of the handle, in one direction of movement.

In FIGS. 7 to 9 we illustrate a rigid bar-like member 29 which may be used with our tool to extract one pipe from the other, namely, to disassemble a joint which has already been made up. Thus, the member 29 may comprise a rigid bar having at one end a slot 31. At the opposite end the member 29 is provided with an outstanding lug 32 which carries a slot 33.

As best shown in FIG. 6 the slot 33 of the plate 32 is adapted to fit over the hook-like member 24 carried by the handle, in effect, therefore, pivoting the member 29 to the handle. With the chain 22 wrapped about the plain end pipe A as shown and with the hook 23 thus securing the chain, the slot 31 on the opposite end of the member 29 is engaged between a pair of links of the chain. It will be noted that the chain 12 is now resting on the plain end pipe A, on the forward side or end of the enlarged section 26 of pipe B. With the parts assembled as shown in FIG. 6, movement of the upper end of the handle to the right as viewed therein puts the member 29 in compression, thus forcing pipe A out of pipe B, inasmuch as the fulcrum chain 12 now engages against the end of the pipe, or more accurately, engages the lip of the gasket 27 which of course is in place in the enlarged section 26. The pipes are thus quite readily separated.

In FIGS. 10 and 11 we show our invention in position ready to assemble an angularly disposed fitting 34 into the enlarged section 26 of a pipe B. Thus, the chain 22 is wrapped about the fitting as shown and one of its links is engaged over another hook-like member 36, similar to the hook 24, which is welded or otherwise secured to the leg of the yoke 11b, opposite the leg 11a where the other end of the chain 21 is secured. With the handle 10 moved to the right from the position shown in FIG. 11, the fitting is pulled into the enlarged section 26, thus making up the joint.

In view of the foregoing it will be seen that we have provided an improved, economical and effective tool both for assemblying and disassemblying pipe joints. Our invention is particularly characterized by the fact that the flexible member 12, such as a link chain, is used to span the yoke of the tool and to rest on top of the pipe, thus to form a fulcrum for the handle. By placing this fulcrum chain either at the rear or at the front of the enlarged end of a given pipe, and by using either a tension member such as a chain 22 or a compression member such as the bar 29, we can either assemble one pipe into the other or disassemble the same. As we also noted, one tool can serve a relatively large range of pipe sizes, and this is because the flexible member 12 adapts itself to the contours of the various size pipes.

It will also be noted that except for the bar 29 all parts of our improved tool are connected together so that there are no loose parts to be accounted for. In practice our invention has proven to be extremely satisfactory and we find it quite easy to use and very effective.

While we have shown our invention in but one form, it will be obvious to those skilled in the art that it is not so limited, but is susceptible of various other changes and modifications without departing from the spirit thereof.

We claim:

1. In a tool useful for forcing a plain end pipe into the enlarged diameter section of another pipe,
    a. a handle having a yoke on its lower end,
    b. said yoke comprising legs disposed to straddle the pipes adjacent the rear end of said enlarged diameter section,
    c. there being a length of chain secured to the legs of the yoke and forming a partial loop disposed partially to encircle the pipe straddled by the yoke,
    d. a second length of chain captively attached at one end to one leg of said yoke and long enough to serve as a member for connecting the handle to the plain end pipe when pulling the pipes together,
    e. the leg of the yoke opposite to which the end of said second chain is attached being provided with means for removably connecting another part of the second chain thereto, whereby the second chain may be connected to both legs of the yoke, forming a loop which may be used to encircle angularly arranged pipe fittings for pulling their plain ends into the enlarged sections thereof, and
    f. means on the handle outwardly of the first chain to connect the second chain to the handle with the second chain wrapped about the plain end pipe, so that when the handle is rocked, the first chain engages said enlarged diameter section and acts as a fulcrum for the handle, thus to pull the pipes together.

* * * * *